United States Patent
Haynes

(10) Patent No.: US 9,191,985 B2
(45) Date of Patent: Nov. 17, 2015

(54) CONNECTING TO AN EVOLVED PACKET DATA GATEWAY

(75) Inventor: Thomas W. Haynes, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 440 days.

(21) Appl. No.: 13/292,881

(22) Filed: Nov. 9, 2011

(65) Prior Publication Data

US 2013/0114432 A1    May 9, 2013

(51) Int. Cl.
*H04W 76/04* (2009.01)
*H04W 76/02* (2009.01)
*H04L 29/06* (2006.01)
*H04L 29/08* (2006.01)

(52) U.S. Cl.
CPC ........... *H04W 76/041* (2013.01); *H04L 63/029* (2013.01); *H04L 67/141* (2013.01); *H04L 69/18* (2013.01); *H04L 69/24* (2013.01); *H04W 76/022* (2013.01); *H04W 76/027* (2013.01)

(58) Field of Classification Search
CPC ......... H04L 41/28; H04L 63/02; H04L 63/20; H04L 63/205; H04L 63/029; H04L 67/141; H04L 69/18; H04L 69/24; H04W 76/041; H04W 76/022; H04W 76/027
See application file for complete search history.

(56) References Cited

U.S. PATENT DOCUMENTS

| | | | |
|---|---|---|---|
| 7,653,200 B2 * | 1/2010 | Karmi et al. | 380/270 |
| 8,023,425 B2 * | 9/2011 | Raleigh | 370/252 |
| 8,060,927 B2 * | 11/2011 | Engdahl et al. | 726/13 |
| 8,150,397 B2 * | 4/2012 | Khetawat et al. | 455/436 |
| 2006/0013192 A1 * | 1/2006 | Le et al. | 370/351 |
| 2006/0092955 A1 * | 5/2006 | Durbin et al. | 370/401 |
| 2006/0185008 A1 * | 8/2006 | Le et al. | 726/11 |
| 2006/0274899 A1 * | 12/2006 | Zhu et al. | 380/281 |
| 2008/0005290 A1 * | 1/2008 | Nykanen et al. | 709/222 |
| 2008/0052769 A1 * | 2/2008 | Leone et al. | 726/7 |
| 2008/0072310 A1 * | 3/2008 | Dutta et al. | 726/14 |
| 2010/0095361 A1 * | 4/2010 | Wang | 726/7 |
| 2011/0216743 A1 * | 9/2011 | Bachmann et al. | 370/331 |
| 2011/0296039 A1 * | 12/2011 | Deu-Ngoc et al. | 709/228 |
| 2011/0310824 A1 * | 12/2011 | Perras et al. | 370/329 |
| 2012/0204253 A1 * | 8/2012 | Sugimoto et al. | 726/12 |

OTHER PUBLICATIONS

3GPP TS 33.402 V8.0.0 (Jun. 2008), "$3^{rd}$ Generation Partnership Project; Technical Specification Group Services and System Aspects; 3GPP System Architecture Evolution (SAE); Security aspects of non-3GPP accesses," Release 8, 34 pages.

3GPP TS 23.402 V9.0.0 (Mar. 2009), "$3^{rd}$ Generation Partnership Project; Technical Specification Group Services and System Aspects; Architecture enhancements for non-3GPP accesses," Release 9, 191 pages.

* cited by examiner

*Primary Examiner* — Alpus H Hsu
*Assistant Examiner* — Walter Divito

(57) ABSTRACT

A user device may receive an access request to access an application provided by a cellular carrier associated with the user device. The user device may use a first type of tunneling protocol to establish a connection, via an evolved packet data gateway (ePDG), to a server that provides the application; determines whether the connection is established using the first type of tunneling protocol; and use a second type of tunneling protocol to establish the connection when the connection is not established using the first type of tunneling protocol. The user device may also use the connection to access the application via the ePDG.

20 Claims, 6 Drawing Sheets

CONNECTING TO AN EVOLVED PACKET DATA GATEWAY

BACKGROUND

Some mobile phone devices can use wireless Internet connections, instead of a cellular network associated with the mobile phone devices, to access applications, such as Internet protocol (IP) multimedia subsystem (IMS) applications, of an operator of the cellular network. To access the applications of the operator, the mobile phone devices use the IP security (IPsec) tunneling protocol to establish a connection via an evolved packet data gateway (ePDG) of the cellular network. However, these mobile phone devices often establish the wireless Internet connection via firewalls that do not support the IPsec tunneling protocol. When that is the case, the mobile phone devices are unable to access the applications of the operator.

DETAILED DESCRIPTION OF PREFERRED EMBODIMENTS

The following detailed description refers to the accompanying drawings. The same reference numbers in different drawings may identify the same or similar elements.

An implementation, described herein, may allow a mobile phone device to access applications of a carrier by using a wireless Internet connection even when a firewall, associated with the wireless Internet connection, does not support the IPsec tunneling protocol. For example, the mobile phone device may, first, attempt to use the IPsec tunneling protocol to establish a connection via an ePDG of a cellular network. When the mobile phone device determines that the connection was not established via the ePDG, the mobile phone device may use the transport layer security (TLS) tunneling protocol or another type of tunneling to successfully establish the connection via the ePDG of the cellular network. Afterwards, the mobile phone device is able to access, via the ePDG, applications of the operator of the cellular network.

Figure 1:
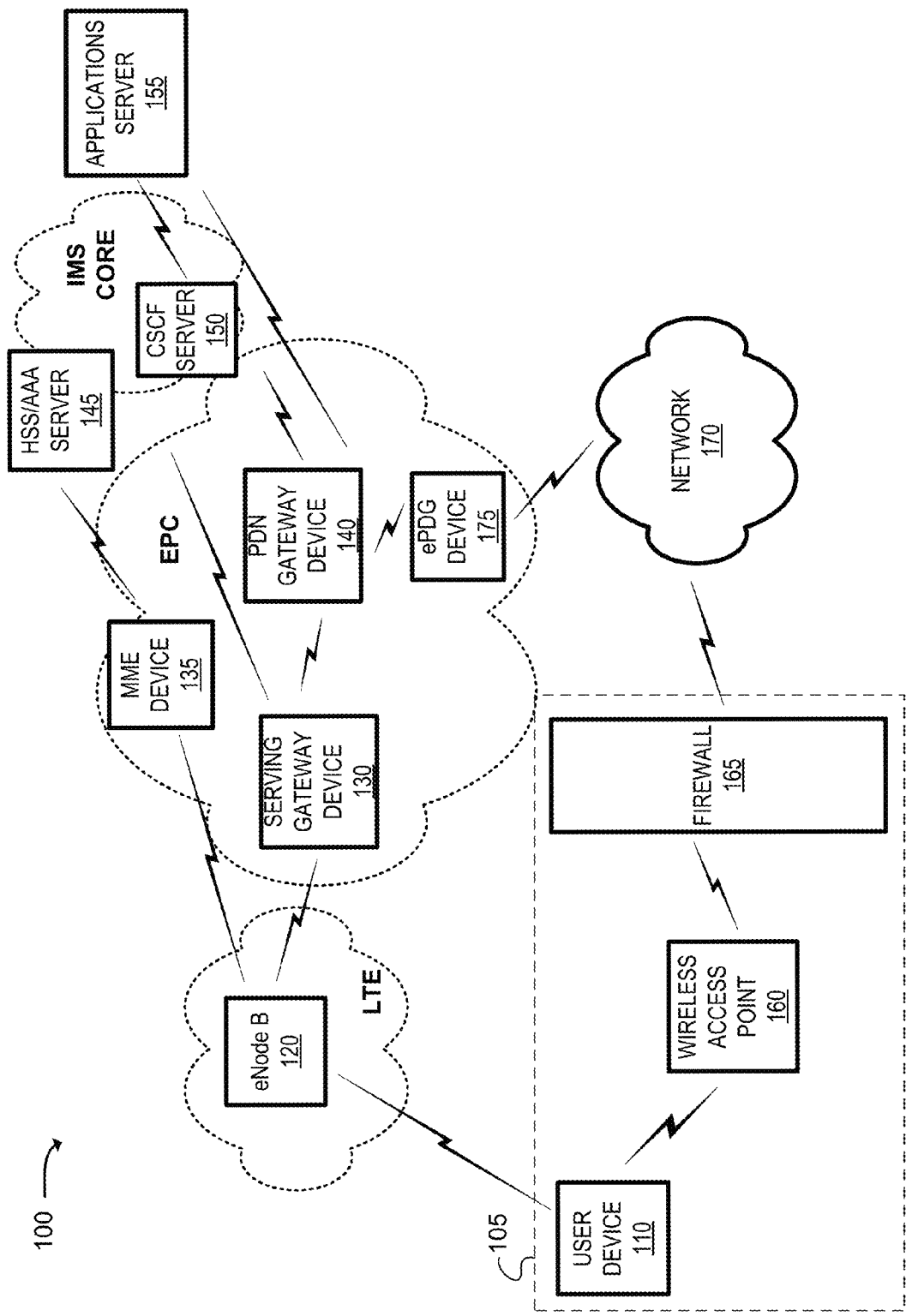
FIG. 1 is a diagram of an example environment in which systems and/or methods described herein may be implemented.

FIG. 1 is a diagram of an example environment 100 in which systems and/or methods described herein may be implemented. As shown in FIG. 1, environment 100 may include one or more of a user device 110, an e-Node B 120 (hereinafter referred to as an "eNB 120"), a serving gateway device 130 (hereinafter referred to as a "SGW 130"), a mobility management entity device 135 (hereinafter referred to as "MME 135"), a packet data network (PDN) gateway device 140 (hereinafter referred to as a "PGW 140"), a home subscriber server (HSS)/authentication authorization accounting (AAA) server 145 (hereinafter referred to as a "HSS/AAA server 145"), a call session control function (CSCF) server 150 (hereinafter referred to as a "CSCF server 150"), an applications services server 155, a wireless access point 160, a firewall 165, a network 170, and an ePDG device 175 (hereinafter referred to as "ePDG 175"). The number of devices and/or networks, illustrated in FIG. 1, is provided for explanatory purposes only. In practice, there may be additional devices and/or networks; fewer devices and/or networks; different devices networks; and/or differently arranged devices and/or networks than are shown in FIG. 1. In some implementations, one or more of the devices of environment 100 may perform one or more functions described as being performed by another one or more of the devices of environment 100.

Furthermore, two or more of the devices, of FIG. 1, may be implemented within a single device, or a single device may be implemented as multiple, distributed devices. Also, in some implementations, one or more of the devices of environment 100 may perform one or more functions described as being performed by another one or more of the devices of environment 100. Devices of environment 100 may interconnect via wired connections, wireless connections, or a combination of wired and wireless connections.

A portion of environment 100 may correspond to an evolved packet system (EPS) that includes a long term evolution (LTE) network and/or an evolved packet core (EPC) that operate based on a third generation partnership project (3GPP) wireless communication standard. The LTE network may be a radio access network (RAN) that includes one or more eNBs 120 via which user device 110 may communicates with the EPC and/or other user devices 110. The EPC may include SGW 130, MME 135, PGW 140, and/or ePDG 175, and enable user device 110 to communicate with an IMS core. The IMS core may include HSS/AAA server 145 and/or CSCF server 150, and may manage authentication, security and/or protection protocols, session initiation protocols, account information, network policy enforcement, subscriber profile information, etc. associated with user device 110.

Another portion of environment 100 may correspond to a geographical area 105 (e.g., a building) that has wireless Internet service provided by an Internet service provider (ISP). User device 110 and/or one or more other user devices, within geographical area 105, may receive the Internet service via wireless access point 160 and/or one or more other wireless access points (not shown in FIG. 1). When user device 110 is using the wireless Internet service of geographical area 105, user device 110 may communicate with devices outside of geographical area 105 only via firewall 165.

User device 110 may include a device, such as a wireless mobile communication device, that is capable of communicating via eNB 120 and wireless access point 160. For example, user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a camera, a personal gaming system, or another type of device. In one example, user device 110 may access applications server 155 via eNB 120 or via wireless access point 160.

eNB 120 may include one or more devices that receive, process, and/or transmit traffic, such as voice, video, text, and/or other data, destined for and/or received from user device 110. One or more eNBs 120 may be associated with the LTE network that receives traffic from and/or sends traffic to IMS core via the EPC. eNB 120 may send traffic to and/or receive traffic from user device 110 via an air interface (e.g., via an LTE-Uu interface).

SGW 130 may include one or more devices that gather, process, search, store, and/or provide information in a manner described herein. SGW 130 may include one or more data processing and/or traffic transfer devices, such as a gateway, that processes and/or transfers traffic. SGW 130 may, for example, aggregate traffic received from one or more eNBs 120 and may send the aggregated traffic to other devices associated with the IMS core and/or the EPC. SGW 130 may also receive traffic from the other devices and/or may send the received traffic to user device 110 via eNB 120. For example, SGW 130 may receive an instruction (e.g., as a result of a registration operation, handoff operation, and/or some other operation) from MME 135 to establish a connection (e.g., a tunnel) that permits user device 110 to communicate with other user devices 110 and/or network devices associated with the LTE, EPC, and/or the IMS core.

MME 135 may include one or more devices that gather, process, search, store, and/or provide information in a manner described herein. For example, MME 135 may perform operations associated with a handoff to and/or from the EPS. MME 135 may perform operations to register user device 110 with the EPS, to handoff user device 110 from the EPS to another network, to handoff a user device 110 from the other network to the EPS, and/or to perform other operations. MME 135 may perform policing operations on traffic destined for and/or received from user device 110.

PGW 140 may include one or more devices that gather, process, search, store, and/or provide information in a manner similar to that described herein. PGW 140 may include one or more data processing and/or traffic transfer devices, such as a gateway, that processes and/or transfers traffic. In one example implementation, PGW 140 may include a device that aggregates traffic received from one or more SGWs 130 and may send the aggregated traffic to the IMS core (e.g., to CSCF server 150). PGW 140 may perform policing operations on traffic destined for the EPS.

HSS/AAA server 145 may include one or more server devices that gather, process, search, store, and/or provide information in a manner described herein. For example, HSS/AAA server 145 may manage, update, and/or store, in a memory associated with HSS/AAA server 145, service profile information associated with user device 110. The service profile information may identify services (e.g., names of services, access point names (APNs), packet data networks (PDNs), etc.) that are subscribed to and/or accessible by user device 110; information associated with a user of user device 110 (e.g., a username, a password, a personal identification number (PIN), etc.); rate information; minutes allowed; a quantity of data usage (e.g., MB usage) allowed; and/or other information. Additionally, or alternatively, HSS/AAA server 145 may include a device that performs authentication, authorization, and/or accounting operations associated with a communication session with user device 110.

CSCF server 150 may include one or more devices that gather, process, search, store, and/or provide information in a manner described herein. In one example implementation, CSCF server 150 may use a session initiation protocol (SIP) for establishing a call session with user device 110. CSCF server 150 may correspond to or include an interrogating-CSCF, a serving-CSCF server, and/or a proxy-CSCF. CSCF server 150 may process and/or route calls to and/or from user device 110. CSCF server 150 may, for example, receive a call from user device 110 (e.g., via eNB 120) and may route the call to a destination device.

Applications server 155 may include one or more server devices, or other types of devices, that gather, process, search, store, and/or provide information in a manner described herein. In one example, applications server 155 may provide one or more applications that provide IP multimedia services, including voice services. Applications server 155 may provide the IP multimedia services via one or more protocols (e.g., via a session initiation protocol (SIP)). In another example, applications server 155 may provide one or more other applications that are associated with a carrier of user device 110.

A carrier may refer to one or more of a cellular carrier, a mobile network operator (MNO), a mobile phone operator, a mobile operator, a carrier service provider (CSP), a wireless service provider, a wireless carrier, a cellular company, and/or any other company that provides mobile phone service(s) to users (e.g., subscribers of the carrier) via a network. Herein, a carrier may also refer to the carrier network (e.g., a cellular network) provided and operated by the carrier.

Wireless access point 160 may include one or more devices that gather, process, search, store, and/or provide information in a manner described herein. In one example, wireless access point 60 may allow wireless devices, such as user device 110, to connect to a network, such as network 170. Wireless access point 160 may connect to network 170 (e.g., the Internet) via a router (not shown in FIG. 1), and may relay data between user device 110 and network 170. Wireless access point 160 may also assign an IP address to user device 110 when user device 170 requests to connect to network 170 via wireless access point 160.

Firewall 165 may include one or more devices that gather, process, search, store, and/or provide information in a manner described herein. In one example, firewall 165 may permit or deny transmission of data between user device 110, wireless access point 160, and/or network 170 based upon a set of rules. Firewall 165 may protect a local area network (LAN) of geographic area 105 from unauthorized access. In one implementation, wireless access point 160 may connect to the router that includes firewall 165. In another implementation, wireless access point 160 may include firewall 165. Additionally, firewall 165 may not support (e.g., allow) the IPsec tunneling protocol, and may only support the TLS tunneling protocol and/or one or more other types of tunneling protocols.

Network 170 may include one or more wired and/or wireless networks. For example, network 170 may include a cellular network, a public land mobile network (PLMN), a second generation (2G) network, a third generation (3G) network, a fourth generation (4G) network, a fifth generation (5G) network, and/or another network. Additionally, or alternatively, network 170 may include a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks. Network 170 may transport traffic between wireless access point 160, via firewall 165, and ePDG 175.

ePDG 175 may include one or more devices that gather, process, search, store, and/or provide information in a manner described herein. ePDG 175 may secure transmission of data between user device 110 and the EPC over an un-trusted non-3GPP access. For example, ePDG 175 may allow user device 110 to access applications server 155 when user device connects to network 170 via wireless access point 160. ePDG 175 may act as a termination node of a tunnel established by user device 110 using a tunneling protocol. ePDG 175 may support the IPsec tunneling protocol. Additionally, or alternatively, ePDG 175 may support at least one tunneling protocol (e.g., the TLS tunneling protocol) that is different from the IPsec tunneling protocol.

Figure 2:
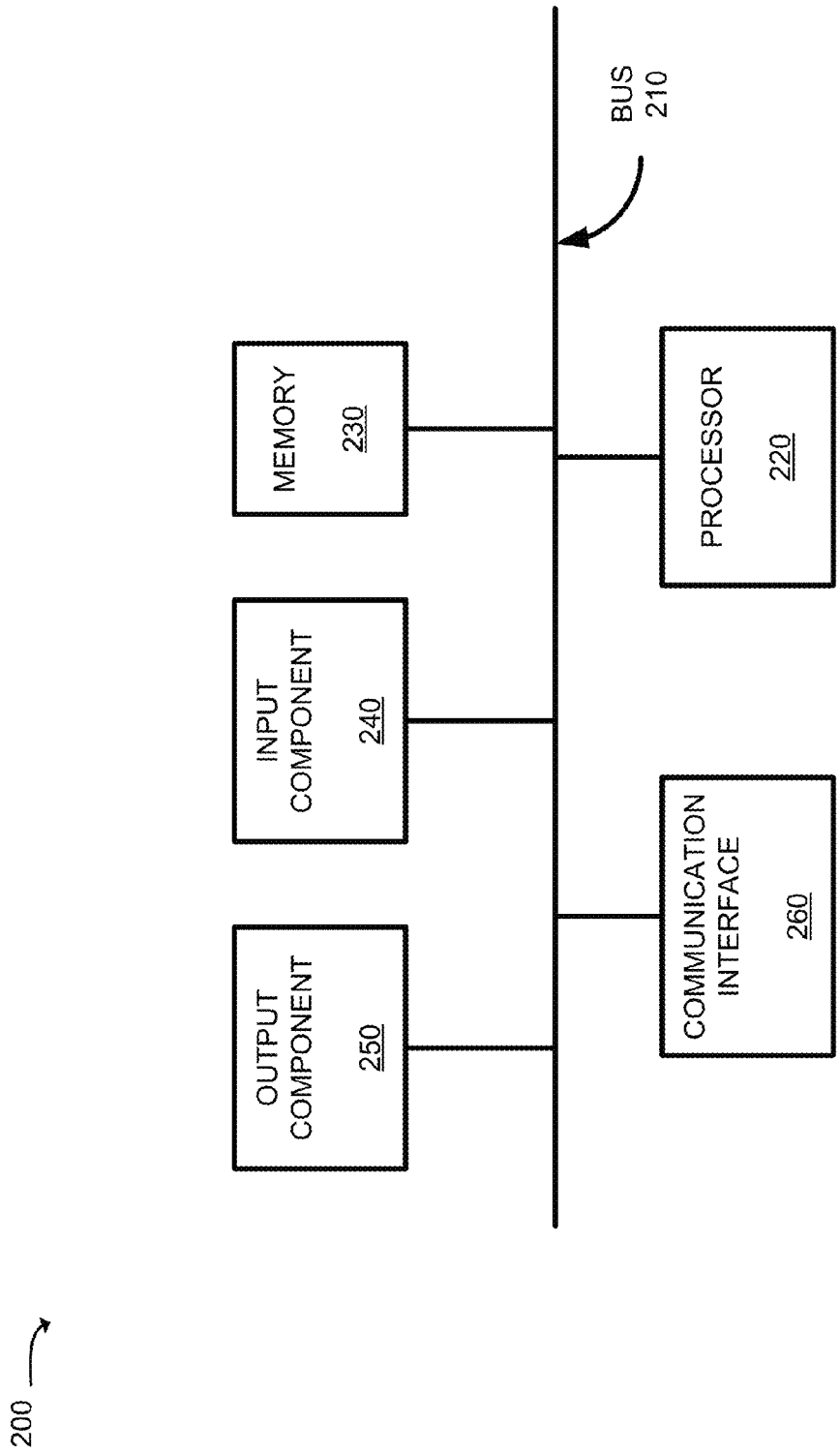
FIG. 2 is a diagram of example components of one or more devices of FIG. 1.

FIG. 2 is a diagram of example components of a device 200. Device 200 may correspond to user device 110, eNB 120, SGW 130, MME 135, PGW 140, HSS/AAA server 145, CSCF server 150, applications server 155, wireless access point 160, firewall 165, and/or ePDG 175. Alternatively, or additionally, each of user device 110, eNB 120, SGW 130, MME 135, PGW 140, HSS/AAA server 145, CSCF server 150, applications server 155, wireless access point 160, firewall 165, and/or ePDG 175 may include one or more devices 200 and/or one or more portions of device 200.

As shown in FIG. 2, device 200 may include a bus 210, a processor 220, a memory 230, an input component 240, an output component 250, and a communication interface 260. Although FIG. 2 shows example components of device 200, in other implementations, device 200 may contain fewer components, additional components, different components, or differently arranged components than depicted in FIG. 2. For example, device 200 may include one or more switch fabrics instead of, or in addition to, bus 210. Additionally, or alternatively, one or more components of device 200 may perform one or more tasks described as being performed by one or more other components of device 200.

Bus 210 may include a path, or collection of paths, that permits communication among the components of device 200. Processor 220 may include a processor, microprocessor, or processing logic that may interpret and execute instructions. Memory 230 may include any type of dynamic storage device that may store information and instructions, for execution by processor 220, and/or any type of non-volatile storage device that may store information for use by processor 220.

Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc. Communication interface 260 may include any transceiver-like mechanism that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 260 may include mechanisms for communicating with another device or system via a network, such as network 170. In one alternative implementation, communication interface 260 may be a logical component that includes input and output ports, input and output systems, and/or other input and output components that facilitate the transmission of data to other devices.

As described herein, device 200 may perform certain operations. Device 200 may perform these operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
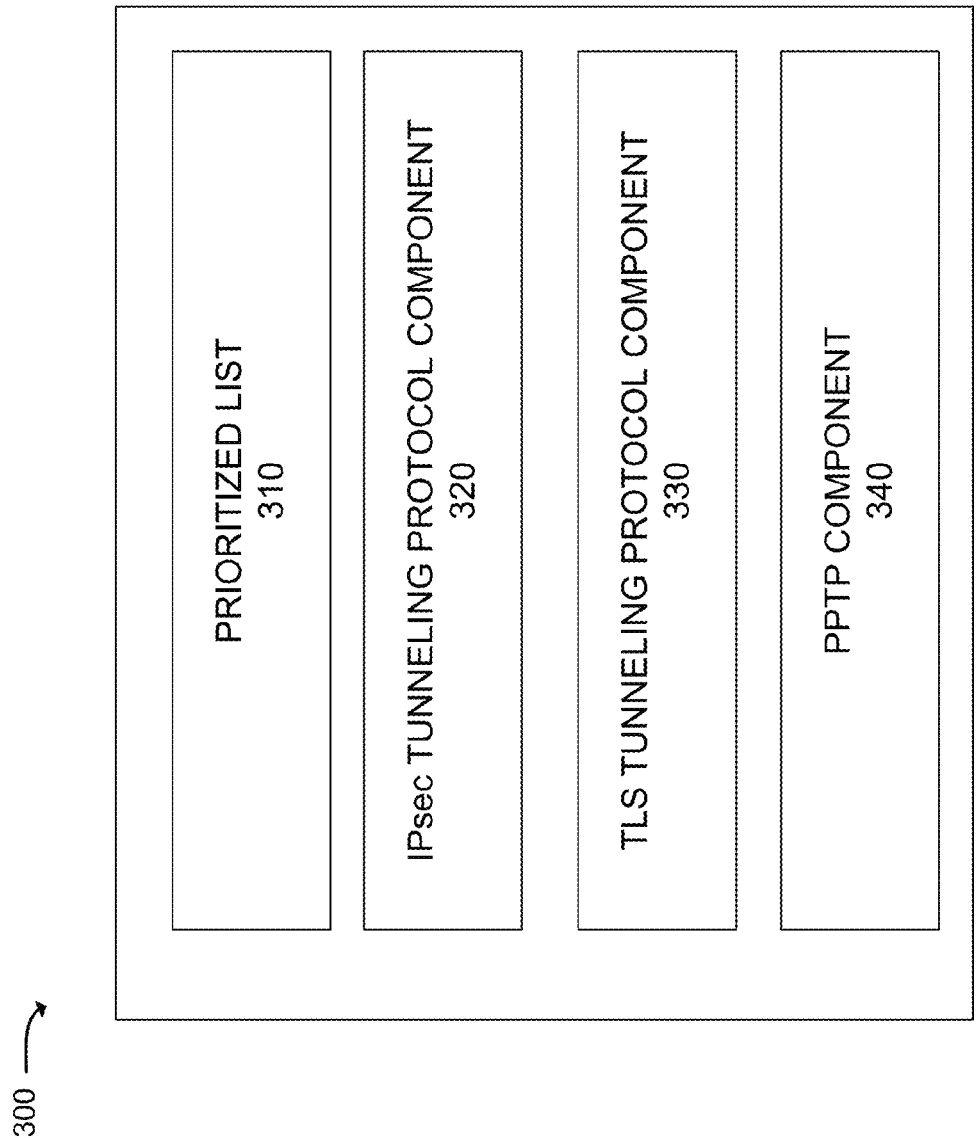
FIG. 3 is a diagram of example functional components of a portion of a user device of FIG. 1.

FIG. 3 is a diagram of example functional components of a portion 300 of user device 110. Portion 300 may establish a tunnel between user device 110 and ePDG 175 in order to allow user device 100 to access applications server 155, which is associated with a carrier of user device 110. As shown in FIG. 3, portion 300 may include one or more of the following components: a prioritized list 310, an IPsec tunneling protocol component 320, a TLS tunneling protocol component 330, and/or a point-to-point tunneling protocol (PPTP) component 340. Although FIG. 3 shows example functional components of portion 300, in other implementations, portion 300 may contain fewer, additional, and/or different functional components, than those depicted in FIG. 2.

Prioritized list 310 may store a list which specifies an order in which user device 110 should use IPsec tunneling protocol component 320, TLS tunneling protocol component 330, and/or PPTP component 340. In one example, prioritized list 310 may specify that the IPsec tunneling protocol, associated with IPsec tunneling protocol component 320, is to be attempted first; the TLS tunneling protocol, associated with TLS tunneling protocol component 330, is to be attempted second; and the PPTP, associated with PPTP component 340, is to be attempted third. User device 110 may use one or more of IPsec tunneling protocol component 320, TLS tunneling protocol component 330, or PPTP component 340 based on prioritized list 310 and/or based on which tunneling protocols are supported by ePDG 175.

IPsec tunneling protocol component 320 may establish an IPsec tunnel between user device 110 and ePDG device 175 when firewall 165 and ePDG device 175 support the IPsec tunneling protocol. TLS tunneling protocol component 330 may establish a TLS tunnel between user device 110 and ePDG device 175 when firewall 165 and ePDG device 175 support the TLS tunneling protocol. PPTP component 340 may establish a PPTP tunnel between user device 110 and ePDG device 175 when firewall 165 and ePDG device 175 support the PPTP.

Figure 4:
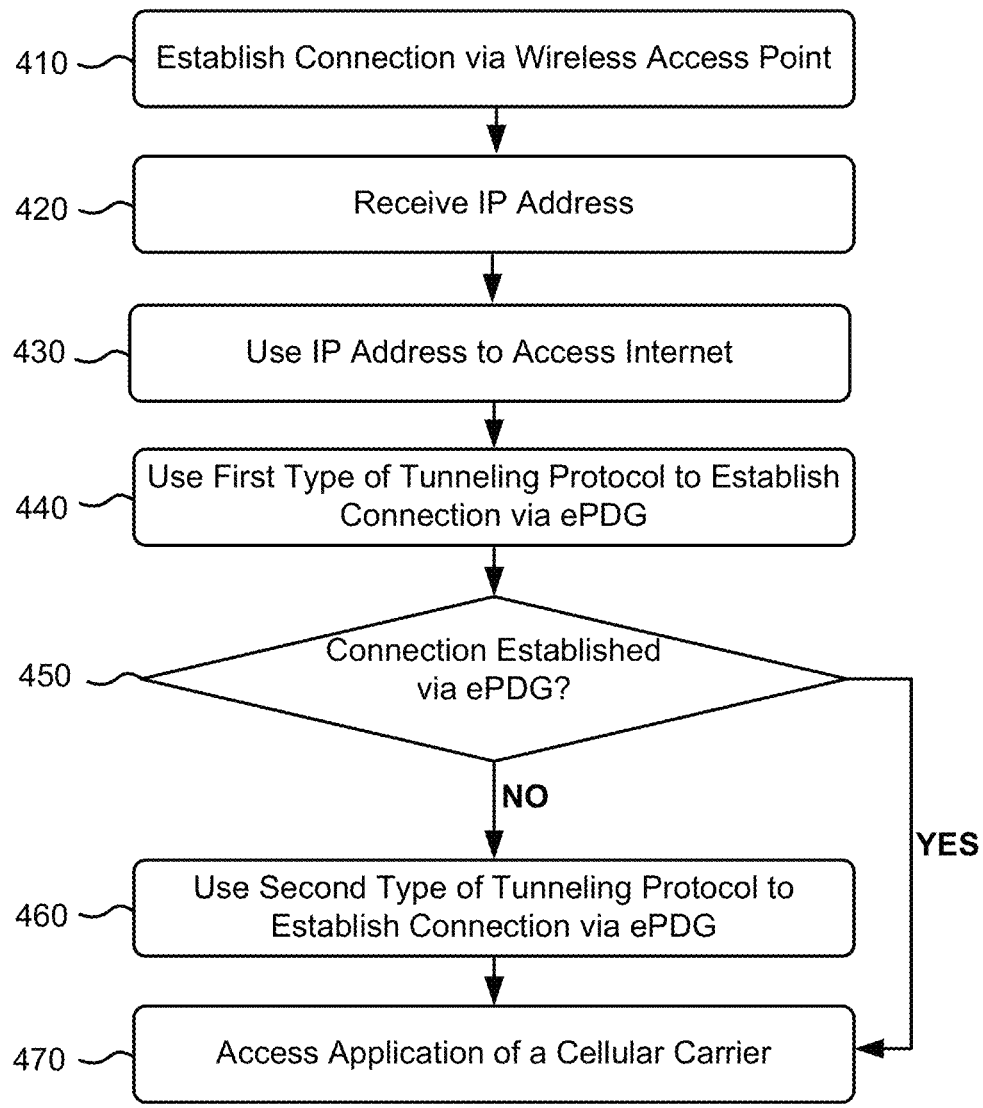
FIG. 4 is a flowchart of an example process for accessing an application of a cellular carrier via an ePDG.

FIG. 4 is a flowchart of an example process 400 for accessing an application of a cellular carrier via ePDG 175. In one example implementation, user device 110 may perform process 400. Alternatively, process 400 may be performed by one or more other devices, alone or in combination with user device 110.

As shown in FIG. 4, process 400 may include establishing a connection via a wireless access point (block 410), receiving an IP address (block 420), and using the IP address to access the Internet (block 430). For example, assume that a user of user device 110 enters geographic location 105 with user device 110. User device 110 may detect that wireless Internet service is provided via wireless access point 160. In order to establish a connection via wireless access point 160, user device 110 may transmit, to wireless access point 160, a request to establish the connection. In response to the request, wireless access point 160 may assign an IP address to user device 110 in order to allow user device 110 to access network 170 via wireless access point 160. Wireless access point 160 may transmit the IP address to user device 110, and user device 110 may receive the IP address. Thereafter, user device 110 may use the IP address to access web servers via network 170, which, for explanatory purposes only, is assumed to be the Internet.

Process 400 may further include using a first type of tunneling protocol to establish a connection via ePDG 175 (block 440) and determining whether a connection is established via ePDG 175 (block 450). For example, assume that user device 110 receives a request from the user to access an application of applications server 155, which is provided by a cellular carrier associated with user device 110. In order to allow user device 110 to access the application, user device 110 may use a first type of tunneling protocol to establish a connection via ePDG 175 to applications server 155. The first type of tunneling protocol may include, for example, the IPsec tunneling protocol. User device 110 may transmit a request to ePDG 175 in order to use the first type of tunneling protocol to establish the connection via ePDG 175. Afterwards, user device 110 may determine whether the connection is established via ePDG 175.

If user device 110 determines that the connection is not established via ePDG 175 (block 450—NO), process 400 may include using a second type of tunneling protocol to establish the connection via ePDG 175 (block 460). For example, the connection may not be established when firewall 165, through which the connection is made, does not support the first type of tunneling protocol. In one implementation, user device 110 may determine that the connection is not established when user device 110 receives, from ePDG 175, a message that indicates a failure to establish the connection using the first type of tunneling protocol. In another implementation, user device 110 may determine that the connection is not established when user device 110 does not receive any response to the request, to use the first type of tunneling protocol, within a particular period of time.

After using the first type of tunneling protocol and determining that the connection is not established via ePDG 175, user device 110 may use a second type of tunneling protocol to establish the connection via ePDG 175. The second type of tunneling protocol may be different from the first type of tunneling protocol. In one implementation, the second type of tunneling protocol may include, for example, a TLS or secure sockets layer virtual private network SSL VPN tunneling protocol. In another implementation, the second type of tunneling protocol may include a PPTP or another type of tunneling protocol that requires authentication and security associations. User device 110 may transmit a request to ePDG 175 in order to use the second type of tunneling protocol to establish the connection via ePDG 175.

If user device 110 determines that the connection is established via ePDG 175 (block 450—YES) or after using the second type of tunneling protocol to establish the connection via ePDG 175 (block 460—NO), process 400 may including accessing an application of a cellular carrier (block 470). For example, the connection may be established using the first type of tunneling protocol, when firewall 165 supports the first type of tunneling protocol. The connection may be established using the second type of tunneling protocol when firewall 165 does not support the first type of tunneling protocol, but supports the second type of tunneling protocol. When the connection is established, ePDG 175 may generate and transmit a message indicating that the connection via ePDG 175 has been successfully established for user device 110. User device 110 may receive the message, and may determine, based on the message, that the connection is established via ePDG 175. Thereafter, the user may use user device 110 to access the application of the cellular carrier by accessing applications server 155 via firewall 165, network 170, and ePDG 175.

Figure 5:
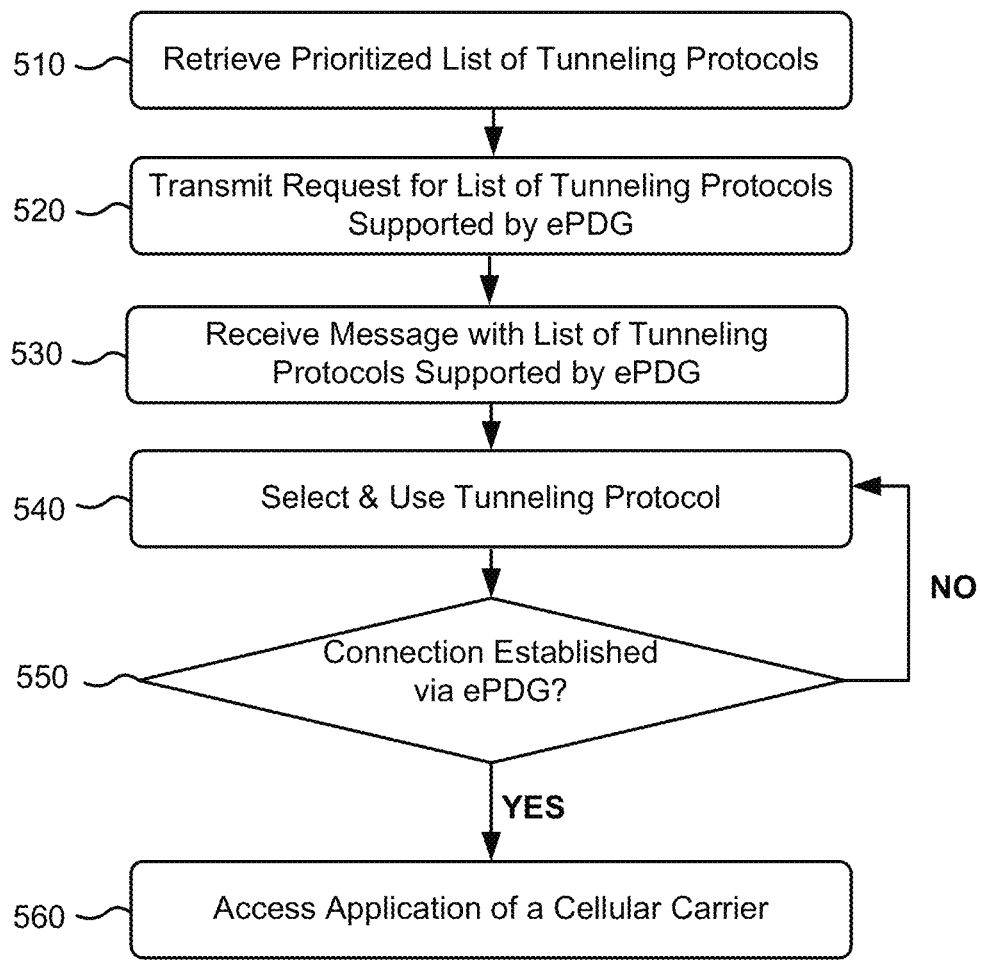
FIG. 5 is a flowchart of another example process for accessing an application of a cellular carrier via an ePDG.

FIG. 5 is a flowchart of an example process 500 for accessing an application of a cellular carrier via ePDG 175. In one example implementation, user device 110 may perform process 500. Alternatively, process 500 may be performed by one or more other devices, alone or in combination with user device 110. Process 500 may occur after user device 110 establishes a connection to network 170 via wireless access point 160.

As shown in FIG. 5, process 500 may include retrieving a prioritized list of tunneling protocols (block 510). For example, user device 110 may receive an access request, from a user, of user device 110 to access an application of a cellular carrier, which is provided by applications server 155. In response to the access request, user device 110 may determine that in order to access the application, user device 110 needs to establish a connection via ePDG 175 to applications server 155. User device 110 may store a prioritized list of tunneling protocols that user device 110 may use to establish the connection via ePDGs, such as ePDG 175. User device 110 may retrieve the prioritized list of tunneling protocols. In one example, the prioritized list of tunneling protocols may list the IPsec tunneling protocol as first, the TLS tunneling protocol as second, etc.

Process 500 may further include transmitting a request for a list of tunneling protocols supported by ePDG 175 (block 520) and receiving a message with the list of tunneling protocols supported by ePDG 175 (block 530). For example, after retrieving the prioritized list of tunneling protocols, user device 110 may transmit, to ePDG 175, a request for a list of tunneling protocols supported by ePDG 175. ePDG 175 may store the list of tunneling protocols. The list of tunneling protocols may include one or more different types of tunneling protocols, including, for example, the IPsec tunneling protocol and the TLS tunneling protocol, which may be used to establish a connection from a user device, such as user device 110, to applications server 155 via ePDG 175. In response to the request for the list of tunneling protocols, ePDG 175 may generate a message that includes the list of tunneling protocols. ePDG 175 may transmit the message with the list of tunneling protocols to user device 110, and user device 110 may receive the message with the list of tunneling protocols.

Process 500 may also include selecting and using a tunneling protocol (block 540) and determining whether a connection is established via ePDG 175 (block 550). For example, after receiving the message with the list of tunneling protocols supported by ePDG 175, user device 110 may select a tunneling protocol from the list of tunneling protocols based on the prioritized list of tunneling protocols. In one example, user device 110 may select the tunneling protocol that is included in the list of tunneling protocols, is ranked highest (e.g., first) on the prioritized list of tunneling protocols, and has not been already unsuccessfully used by user device 110 to attempt to establish the connection via ePDG 175. For example, user device 110 may, first, select the IPsec tunneling protocol when the IPsec tunneling protocol is included in the list of tunneling protocols, is listed first in the prioritized list of tunneling protocols, and has not been already unsuccessfully used by user device 110 to attempt to establish the connection via ePDG 175. User device 110 may use the IPsec tunneling protocol to establish the connection via ePDG 175 by transmitting a request, to ePDG 175, to establish the connection by using the IPsec tunneling protocol. User device 110 may determine whether the connection is established, as described above with reference to blocks 450 and 460 of FIG. 4.

If user device 110 determines that the connection is not established via ePDG 175 (block 550—NO), process 500 may include again selecting and using another tunneling protocol (block 540). For example, the connection may not be established when firewall 165 does not support the selected tunneling protocol. After determining that the connection is not established, user device 110 may select another tunneling protocol that is included in the list of tunneling protocols and is ranked higher (e.g., second) on the prioritized list of tunneling protocols than the other tunneling protocol(s) that have not already been unsuccessfully used by user device 110 to attempt to establish the connection via ePDG 175. For example, user device 110 may select the TLS tunneling protocol when the TLS tunneling protocol is included in the list of tunneling protocols, is listed second in the prioritized list of tunneling protocols (e.g., after the IPsec tunneling protocol), and has not yet been already used by user device 110 to attempt to establish the connection via ePDG 175. User device 110 may use the TLS tunneling protocol to establish the connection via ePDG 175 by transmitting a request, to ePDG 175, to establish the connection by using the TLS tunneling protocol.

If user device 110 determines that the connection is established via ePDG 175 (block 550—YES), process 500 may include accessing an application of a cellular carrier (block 560). For example, the connection may be established when firewall 165 supports the last selected tunneling protocol. After user device 110 determines that the connection is established via ePDG 175, user device 100 may access the application of the cellular carrier, as described above with reference to block 470 of FIG. 4.

Figure 6:
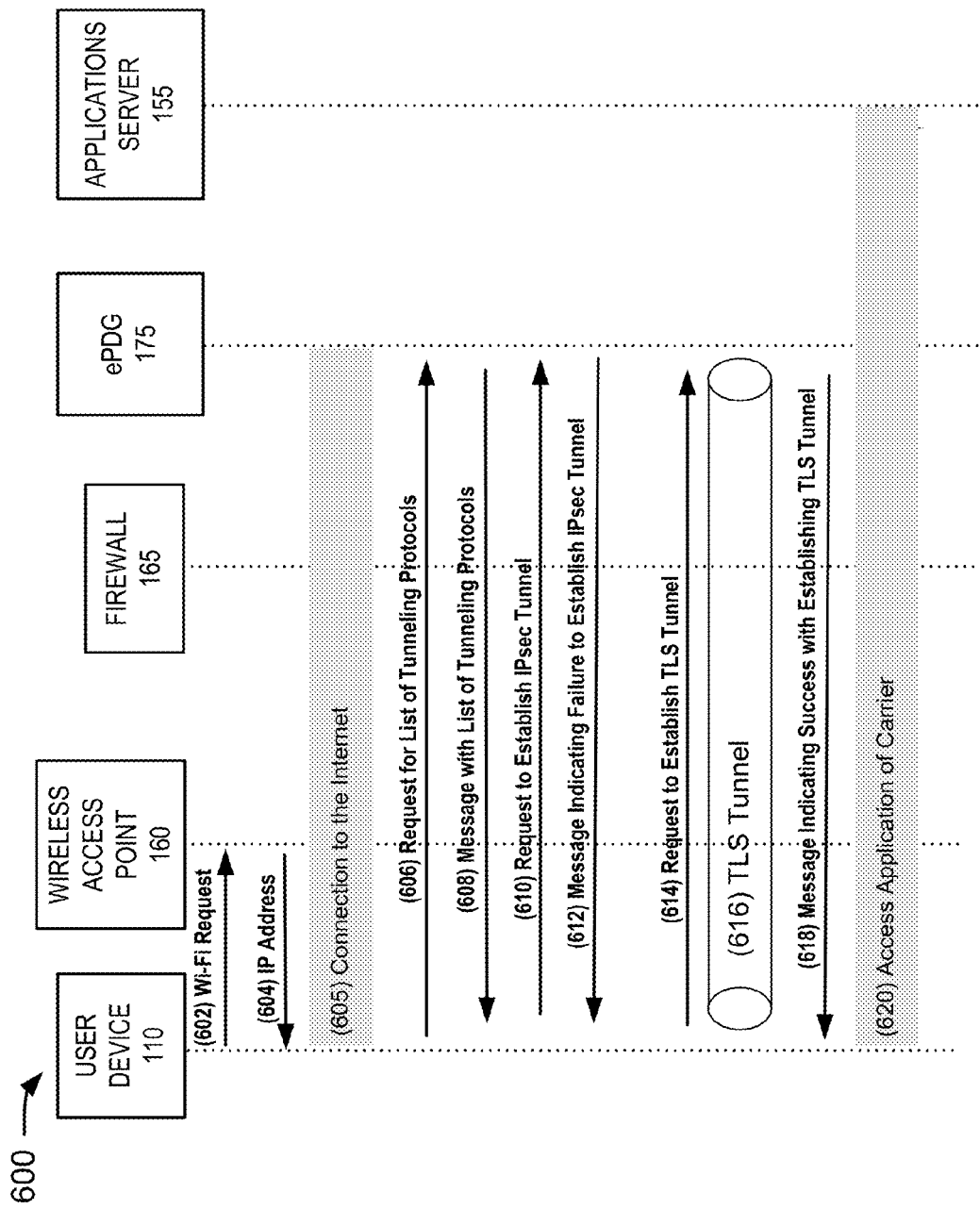
FIG. 6 is a flow diagram of an example of accessing applications of a carrier via an ePDG.

FIG. 6 is a flow diagram 600 of an example of accessing applications of a carrier via ePDG 175. For this example, assume that firewall 165 supports the TLS tunneling protocol, but does not support the IPsec tunneling protocol. For example, a user of user device 110 may enter geographic area 105 with user device 110. User device 160 may detect that wireless Internet service is provided via wireless access point 160. User device 160 may transmit a Wi-Fi request 602 to wireless access point 160 in order to use the wireless Internet service. In response to Wi-Fi request 602, wireless access point 160 may assign an IP address 604 to user device 110, and may transmit a message with IP address 604. Afterwards, user device 110 may use IP address 604 in order to establish a connection 605 to the Internet (i.e., network 170).

The user of user device 110 may prompt user device 110 to access an application provided by a cellular carrier associated with user device 110. User device 110 may determine that user device 110 needs to establish a connection via ePDG 175 in order to access the application, which is provided by applications server 155 of the cellular carrier. User device 110 may transmit, via network 170, a request 606 for a list of tunneling protocols to ePDG 175, and may receive a message 608 with the list of tunneling protocols from ePDG 175. Assume that the list of tunneling protocols specifies that ePDG 175 supports the IPsec tunneling protocol and the TLS tunneling protocol. User device 110 may transmit, to ePDG 175, a request 610 to establish an IPsec tunnel. ePDG 175 may determine that the IPsec tunnel may not be established because firewall 165 does not support the IPsec tunneling protocol. Therefore, in response to request 610, ePDG 175 may transmit a message 612 indicating a failure to establish IPsec tunnel to user device 110.

In response to message 612, user device 110 may select the TLS tunneling protocol, and may transmit, to ePDG 175, a request 614 to establish a TLS tunnel. In response to request 614, ePDG 175 may successfully establish a TLS tunnel 616 between ePDG 175 and user device 110 because firewall 165 supports the TLS tunneling protocol. ePDG 175 may transmit, to user device 110, a message 618 indicating success with establishing TLS tunnel 616. After TLS tunnel 616 is established, the user may use user device 110 to access 620 applications of the cellular carrier. User device 110 may use access 620 to transmit data, via tunnel 616, to applications server 155. User device 110 may also receive data, via tunnel 616, from applications server 155.

The foregoing description provides illustration and description, but is not intended to be exhaustive or to limit the invention to the precise form disclosed. Modifications and variations are possible in light of the above teachings or may be acquired from practice.

While series of blocks have been described with regards to FIGS. 4 and 5, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code-it being understood that software and control hardware can be designed to implement the systems and methods based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a user device, an access request to access an application provided by a cellular carrier associated with the user device,
      the application providing one or more IP multimedia services;
   using, by the user device, a first type of tunneling protocol to attempt to establish a connection, via an evolved packet data gateway (ePDG), to a server that provides the application;
   determining, by the user device, that the connection is not established using the first type of tunneling protocol based on receiving a message that indicates a failure to establish the connection using the first type of tunneling protocol or based on not receiving a response to a request to establish the connection within a particular period of time,
      the connection being not established using the first type of tunneling protocol when a firewall, between the user device and the ePDG, does not support the first type of tunneling protocol;
   using, by the user device, a second type of tunneling protocol to establish the connection based on determining that the connection is not established using the first type of tunneling protocol,
      the second type of tunneling protocol being different from the first type of tunneling protocol; and using, by the user device, the connection to access the application via the ePDG.

2. The method of claim 1, where the first type of tunneling protocol is an Internet protocol security (IPsec) tunneling protocol.

3. The method of claim 1, where the second type of tunneling protocol is one of:
a transport layer security (TLS) tunneling protocol, or
a point-to-point tunneling protocol (PPTP).

4. The method of claim 1, where using the first type of tunneling protocol to attempt to establish the connection comprises:
transmitting, to the ePDG, a first request for a list of at least one tunneling protocol supported by the ePDG,
receiving, from the ePDG, the list of the at least one tunneling protocol,
selecting the first type of tunneling protocol from the list of the at least one tunneling protocol, and
transmitting, to the ePDG, a second request to establish the connection by using the first type of tunneling protocol.

5. The method of claim 4,
where using the first type of tunneling protocol to attempt to establish the connection comprises:
transmitting, to the ePDG, the request to establish the connection by using the first type of tunneling protocol, and
where determining that the connection is not established using the first type of tunneling protocol comprises:
determining that the response to the request to establish the connection has not been received,
determining a time period after transmitting the request to establish the connection,
determining that the time period satisfies the particular time period, and
determining that the connection is not established using the first type of tunneling protocol based on determining that the response has not been received and based on determining that the time period satisfies the particular period of time.

6. The method of claim 4, further comprising:
selecting the first type of tunneling protocol based on a priority of the first type of tunneling protocol.

7. The method of claim 1, where determining that the connection is not established using the first type of tunneling protocol comprises:
receiving, from the ePDG, the message that indicates the failure to establish the connection using the first type of tunneling protocol, and
determining that the connection is not established using the first type of tunneling protocol based on the message.

8. The method of claim 1, further comprising:
detecting that wireless Internet service is provided via a wireless access point;
transmitting, to the wireless access point, a request to establish a wireless Internet connection via the wireless access point; and
receiving, from the wireless access point and before using the first type of tunneling protocol, an Internet protocol (IP) address assigned to the user device.

9. A device comprising:
a memory; and
a processor to:
receive a request to access an application provided by a cellular carrier associated with the device,
the application providing one or more IP multimedia services,
use a first type of tunneling protocol to attempt to establish a connection, via an evolved packet data gateway (ePDG), to a server that provides the application,
determine that the connection is not established using the first type of tunneling protocol based on receiving a message that indicates a failure to establish the connection using the first type of tunneling protocol or based on not receiving a response to a request to establish the connection within a particular period of time,
the connection being not established using the first type of tunneling protocol when a firewall, between the device and the ePDG, does not support the first type of tunneling protocol, and
use a second type of tunneling protocol to establish the connection after determining that the connection is not established using the first type of tunneling protocol,
the second type of tunneling protocol being different from the first type of tunneling protocol.

10. The device of claim 9,
where the memory is to store a first list of prioritized tunneling protocols supported by the device, and
where the processor is further to:
select the second type of tunneling protocol that is included in the first list based on determining that the connection is not established using the first type of tunneling protocol.

11. The device of claim 10, where the first type of tunneling protocol has a higher priority than the second type of tunneling protocol in the first list.

12. The device of claim 9, where, when determining that the connection is not established, the processor is to:
determine a time period after using the first type of tunneling protocol,
determine that the time period satisfies the particular time period, and
determine that the connection is not established based on determining that the time period satisfies the particular period of time.

13. The device of claim 9,
where the first type of tunneling protocol is an Internet protocol security (IPsec) tunneling protocol, and
where the second type of tunneling protocol is a transport layer security (TLS) tunneling protocol.

14. The device of claim 9, where the processor is further to:
use, after the connection is established, the connection to access the application via the ePDG.

15. The device of claim 9, where the processor is further to:
transmit, to the ePDG, a request for a list of tunneling protocols supported by the ePDG,
receive, from the ePDG, a message that includes the list of tunneling protocols, and
select the first type of tunneling protocol that is included in the list of tunneling protocols supported by the ePDG.

16. One or more non-transitory computer-readable media storing instructions, the instructions comprising:
one or more instructions, which when executed by one or more processors of a network device, cause the one or more processors to receive an access request to access an application provided by a cellular carrier associated with the network device,
the application providing one or more Internet protocol (IP) multimedia services;
one or more instructions, which when executed by the one or more processors of the network device, cause the one or more processors to transmit, to an evolved packet data gateway (ePDG) and via an Internet connection, a first request to attempt to establish a first type of tunnel by using a first type of tunneling protocol;

one or more instructions, which when executed by the one or more processors of the network device, cause the one or more processors to determine that the first type of tunnel is not established using the first type of tunneling protocol based on receiving a message that indicates a failure to establish the first type of tunnel by using the first type of tunneling protocol or based on not receiving, within a particular period of time, a response to the first request, the first type of tunnel being not established when a firewall, between the network device and the ePDG, does not support the first type of tunneling protocol;

one or more instructions, which when executed by the one or more processors of the network device, cause the one or more processors to transmit, to the ePDG and via the Internet connection, a second request to establish a second type of tunnel by using a second type of tunneling protocol based on determining that the first type of tunnel is not established, the second type of tunneling protocol being different from the first type of tunneling protocol; and one or more instructions, which when executed by the one or more processors of the network device, cause the one or more processors to use the second type of tunnel after the second type of tunnel is established.

17. The one or more non-transitory computer-readable media of claim 16, where the first type of tunneling protocol is an Internet protocol security (IPsec) tunneling protocol, where the first type of tunnel is an IPsec tunnel, where the second type of tunneling protocol is a transport layer security (TLS) tunneling protocol, and where the second type of tunnel is a TLS tunnel.

18. The one or more non-transitory computer-readable media of claim 16, where the instructions further comprise:

one or more instructions to retrieve a prioritized list of tunneling protocols supported by the network device before transmitting the first request to the ePDG, and where the first type of tunneling protocol has a higher priority than the second type of tunneling protocol in the prioritized list of tunneling protocols.

19. The one or more non-transitory computer-readable media of claim 16, where the instructions further comprise:

one or more instructions, which when executed by the one or more processors of the network device, cause the one or more processors to select the first type of tunneling protocol based on a priority of the first type of tunneling protocol.

20. The one or more non-transitory computer-readable media of claim 16, where the instructions further comprise:

one or more instructions, which when executed by the one or more processors of the network device, cause the one or more processors to establish an Internet connection via a wireless access point before receiving the access request to access the application.

\* \* \* \* \*